[11] 3,583,299

| | | | |
|---|---|---|---|
| [72] | Inventor | Edv<br>Cam... | |
| [21] | Appl. No. | 765,396 | |
| [22] | Filed | Oct. 7, 1968 | |
| [45] | Patented | June 8, 1971 | |
| [73] | Assignee | Polaroid Corporation<br>Cambridge, Mass. | |

[54] ENVIRONMENTALLY COMPENSATED FOLLOW-FOCUS FLASH PHOTOGRAPHY
42 Claims, 4 Drawing Figs.

[52] U.S. Cl............................................ 95/10,
95/53, 95/64, 250/205, 250/215
[51] Int. Cl........................................ G03b 7/08,
G01j 1/42
[50] Field of Search............................ 95/10 C,
11.5, 64 A, 53; 250/205, 215

[56] References Cited
UNITED STATES PATENTS
3,173,347  3/1965  Stimson et al. ............... 95/11.5X

| | | | |
|---|---|---|---|
| | | elsmann et al........... | 95/11.5 |
| | | ...ad............................ | 95/10(C) |
| 3,418,904 | 12/1968 | Wick et al..................... | 95/10(C) |
| 3,426,661 | 2/1969 | Wick et al..................... | 95/10(C) |
| 3,465,656 | 9/1969 | Wick et al..................... | 95/11.5X |

Primary Examiner—Samuel S. Matthews
Assistant Examiner—Joseph F. Peters, Jr.
Attorneys—Brown and Mikulka, William D. Roberson and Gerald L. Smith ABSTRACT: An exposure control system for flash photography. With the system, an initial exposure value determination is made based upon camera-to-subject distance and the intensity of the source of flash illumination. This exposure value is corrected by a value representing the reflective characteristics of the environment surrounding the subject of principal photographic interest. The latter correction may be derived by measuring and integrating environmental reflection from a metering light source. The metering light source is provided at a frequency nonharmonically related to that of ambient artificial illumination.

ENVIRONMENTALLY COMPENSATED FOLLOW-FOCUS FLASH PHOTOGRAPHY

BACKGROUND OF THE INVENTION

The quality of photographs taken with flash photographic equipment is often dependent upon the ability of the photographer to gauge the reflective effects of the surroundings of a subject being photographed. Unlike the light evaluation techniques utilized while taking photographs under ambient or continuous illumination, the subject lighting derived from a flash unit cannot be observed and evaluated in detail prior to making an exposure. As a result, any exposure value to which the shutter and lens system of a camera is set for flash exposure is usually ascertained beforehand.

To make this preliminary evaluation, photographers generally turn to an analytic approach derived from the characteristics of the flash light source. This approach fundamentally is based upon an application of the inverse square law for light energy propagation. Under this law, the light energy available from a given source is considered to vary inversely with the square of the distance from that source. Exposure values relating, inter alia, to functions of illumination and time interval of exposure may be determined by applying the rule to a given photographic situation. In practice, the photographer makes use of the rule by initially determining the camera-to-subject distance; then, by simple computation, this distance is factored into a reference or guide number correlating light energy with distance, lens and reflector characteristics and film sensitivity to evolve an exposure value. The camera exposure mechanism may be adjusted to a conformance with the above-noted precomputed exposure value using any of several alternative approaches. For instance, lens aperture may be adjusted; shutter speed may be varied; the time interval of energization of the flash may be altered; or the initial brightness of the light source may be adjusted. Generally, flash guide numbers are computed for use with aperture adjustment. In some applications, the aperture adjustment is effected automatically by incorporating what is termed as a "follow-focus" mechanism into the exposure apparatus of a camera. With a follow-focus arrangement, aperture adjustment for flash illumination is coupled mechanically or otherwise with the rangefinding or focusing system of the camera.

Prior systems for determining flash exposure values based on camera-to-subject distance have generally ignored variations in reflectivity which may be present in the environment of the subject of principal interest. To ignore variations in reflectivity of a photographic subject or of its environment is to limit the percentage of photographs taken by flash illumination which will be found acceptable. Significant numbers of photographic situations are encountered wherein strict reliance upon a formula based on the camera-to-subject distance yields exposure values which would produce unacceptable or marginally acceptable photographs. For example, a photographic environment may include reflective walls or the like situated near a subject posed at relatively close camera-to-subject distances. In such an environment, the subject receives flash illumination not only directly from the flash source but also indirectly from the reflective walls. In order to take into account such environmental influences, the photographer may modify a derived exposure value based on his personal experience and insight. Alternatively, he may make a series of bracketed exposures at different exposure values to assure the selection of at least one appropriate exposure value.

SUMMARY OF THE INVENTION

The invention now presented introduces a novel exposure control system for flash photography. Responsive both to the camera-to-subject distance and to the environment of the scene being photographed, the system is capable of advantageously recognizing and evaluating complex lighting situations.

By uniquely interrelating the functions of range and environmental reflectivity, the invention provides an exposure control combining the desirable attributes of conventional range responsive systems with those of photosensitive metering techniques. The advantageous accuracies of conventional light evaluating techniques are maintained with the instant system while accommodating for variations in the otherwise fixed parameters of environmental reflectivity upon which they are based. As a result, the control system of the invention is capable of deriving reliable and accurate exposure values over the entire range of photographic flash light situations which may be encountered. With the present system, accurate exposure values are derived without a necessary recourse to the individualized expertize of the photographer in assessing a lighting situation.

A feature of the invention is the provision of an exposure control system primarily responsive to the range of the object of principal photographic interest and which is compensated for the reflective characteristics of the environment surrounding that object.

The invention is further characterized in providing for such environmental compensation through the use of photosensitive techniques to derive an integrated valuation of the reflection characteristics of the environment of the subject of photographic interest. In a principal embodiment of this technique, environmental reflectivity is evaluated through the use of a metering light source adapted to produce a preliminary scene illumination at a frequency selected for exclusive detection. The reflection of this metering light source from the scene is detected in isolation from ambient light. The reflected light is then utilized to derive an adjustment or corrective factor for an exposure value based primarily upon the camera-to-subject distance.

In another and preferred aspect of the invention, the above described integrated light valuation is utilized to derive a corrective factor relating environmental reflectivity as a function of range.

In addition to the foregoing, the objects of the invention include the provision of an environmentally compensated range-responsive exposure control system for flash photography adapted to derive a basic exposure value based upon the intensity of illumination of the subject at any selected camera-to-subject distance. The system provides a correction factor for this basic exposure value determined by the integrated value of reflection from the environment of the subject as well as by the range of the subject. Light for determining the corrective factor is produced by the preliminary flash of a metering light source having an excitation frequency selected to be nonharmonic with that of ambient light.

An embodiment of the invention will be seen to provide the aforedescribed initial exposure value through the use of a conventional follow-focus arrangement.

Other objects of the invention will in part be obvious and will in part appear hereinafter.

The invention accordingly comprises the system, apparatus and method possessing the features, techniques, and properties which are exemplified in the description to follow hereinafter and the scope of the application will be indicated in the appended claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE DRAWINGS

The exposure control system of the invention derives accurate, environmentally compensated exposure values which, in turn, are used as a basis for adjusting the exposure control system of a camera. Numerous alternatives are available for conforming the exposure instrumentation of a camera to reflect this precomputed adjustment, for instance, its lens aperture opening may be varied. This latter form of adjustment is represented in the ensuing discussion for purposes of illustrating the operation of the system.

In developing an accurate exposure value for any flash photographic situation encountered, the present system functions between certain valuations. The inverse square law theoretically represents a higher exposure value limitation. Conversely, an integrated empirical valuation of light reflecting from a dominantly reflective environment represents a lower exposure value limitation. The invention contemplates the formation of a light value correction factor which when associated with the above valuations will develop an ultimately accurate exposure value.

Figure 1:
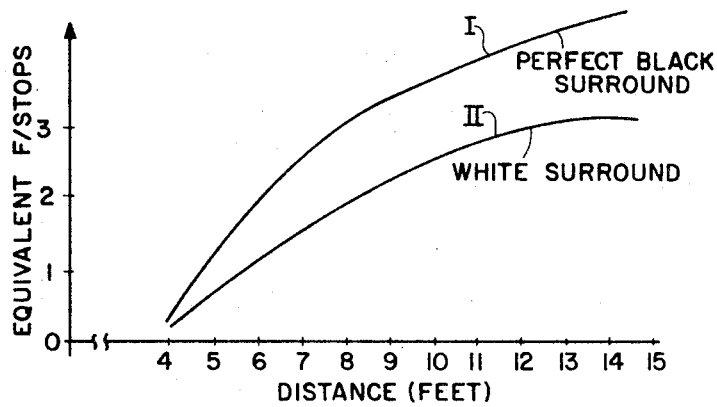
FIG. 1 is a chart depicting the range of equivalent aperture corrections which may be encountered when photographing under the two opposite extremes of subject surround conditions.
Figure 2:
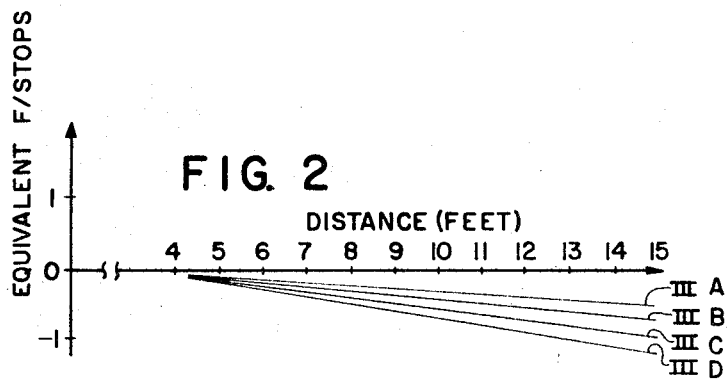
FIG. 2 is a chart having the same indicia as used in FIG. 1 and showing a series of curves defining aperture correction for accommodating environmental reflectivity.

For the purpose of facilitating an understanding of this correction factor, a set of illustrative curves is provided in FIGS. 1 and 2. In these figures, exposure value adjustments are represented along the vertical axes as variations in camera lens aperture. All of the curves are plotted assuming a fixed exposure time, constant subject exposure and a constant energy level of flash illumination. It follows, therefore, that the equivalent F stops plotted along the vertical axis are proportional to corresponding variations in exposure values. The horizontal axes of the curves represent camera-to-subject or object distances. For purposes of flash photography, this distance will coincide with the range from the light source to the subject of principal interest.

Within a perfectly nonreflective environment, sometimes referred to as a "black surround," the camera-to-subject approach is considered to evolve accurate exposure values for illuminating an average subject. The approach, being theoretically derived from the inverse square law, is represented by the curve shown at I. Note from the curve that as the camera-to-subject distance increases, a corresponding light energy diminution will require progressively larger aperture openings to produce a consistent level of exposure. Since curve I is plotted with respect to the total light energy available from a flash source, it suggests the maximum exposure value adjustment for a camera aperture.

Turning now to an opposite environment for the subject of principal interest, curve II has been experimentally derived by consistently exposing an average subject within a reflective surrounding. Empirical in nature, curve II represents exposure value adjustment required for good exposure using the same flash light source, but to illuminate a subject within a highly reflective environment. This environment is sometimes referred to as a "white surround." Curve II indicates that as the camera-to-subject distance increases, corresponding light energy diminution will require progressively larger aperture openings to produce a consistent level of exposure. However, inasmuch as the exposures forming curve II incorporate the maximum light additive effect of a reflective surround, the curve represents the least aperture opening which may be required at any select object distance.

The control system of the present invention is devised recognizing that proper F stop adjustments (or corresponding exposure value adjustments) for a given photographic situation will fall within an adjustment range, the limits of which are represented by corresponding coaxial points on curves I and II. Additionally, the selection of an appropriate exposure value within this range will be determined as a function of the degree of environmental reflectivity. Analogically, it may be noted that photographers tend to favor the selection of exposure values suggested by curve II at the usually close camera-to-subject distances encountered in indoor picture taking situations. This practice represents a recognition of the reflective aspects of wall structures and the like. Reliance upon the camera-to-subject distance formula in such situations may lead to overexposed pictures. At relatively longer object distances, however, photographers generally rely upon the curve I formula inasmuch as any dominant reflective environments will be too far removed from the subject to have an effect upon the exposure. Difficulty is witnessed in judging appropriate exposure values between the curves where the reflective characteristics of an environment are complex and not simply assessed.

The control system of the instant invention generates a correction factor based upon environmental reflectivity. This correction factor is then applied to an initial lighting evaluation based upon the camera-to-subject technique to evolve an exposure value falling between curves I and II and, therefore, more responsive to true lighting conditions. Referring to FIG. 2, illustrative representations of environmental correction factors are shown as a series of curves IIIa through IIId. Each of the curves represents the degree of reflectivity of a different photographic environment as it relates to camera-to-subject distance. The corrections are derived as integrated valuations of reflected light measured in isolation from artificial ambient lighting. Should no reflective characteristics be present in the environment of a scene, the correction factor is zero and its representative curve falls along the horizontal axis of FIG. 2. Imposed in correction upon an initial lighting evaluation based upon curve I, this zero correction will permit the "black surround" exposure value determination to remain unaltered.

As the degree of environmental reflectivity of scenes to be photographed increases, however, the magnitude of the correction factor, correspondingly, becomes more pronounced. This progressive variation toward higher reflectivity is depicted by the increasing magnitudes of correction represented by the succession of curves IIIa through IIId. Applying the correction factor represented by the curves will provide exposure values lying intermediate curves I and II. Beyond the correction factor represented by curve IIId, the exposure control system corrects to the boundaries of limiting curve II.

In order to facilitate the design of exposure control devices incorporating the present system, it is preferred that the correction factor be applied in a subtractive manner to the inverse square value as shown at curve I. For this reason, the curves of FIG. 2 are illustrated having a negative orientation. As a further refinement, the correction factor is considered to represent a function not only of the integrated valuation of light reflecting from the environment, but also of camera-to-subject distance. The latter consideration accounts for the dominant influence of a reflective surround when encountered at close ranges and of its minor influence as the limiting range of the flash illumination is approached. This refinement in generating the correction factor serves to improve its accuracy.

Figure 3:
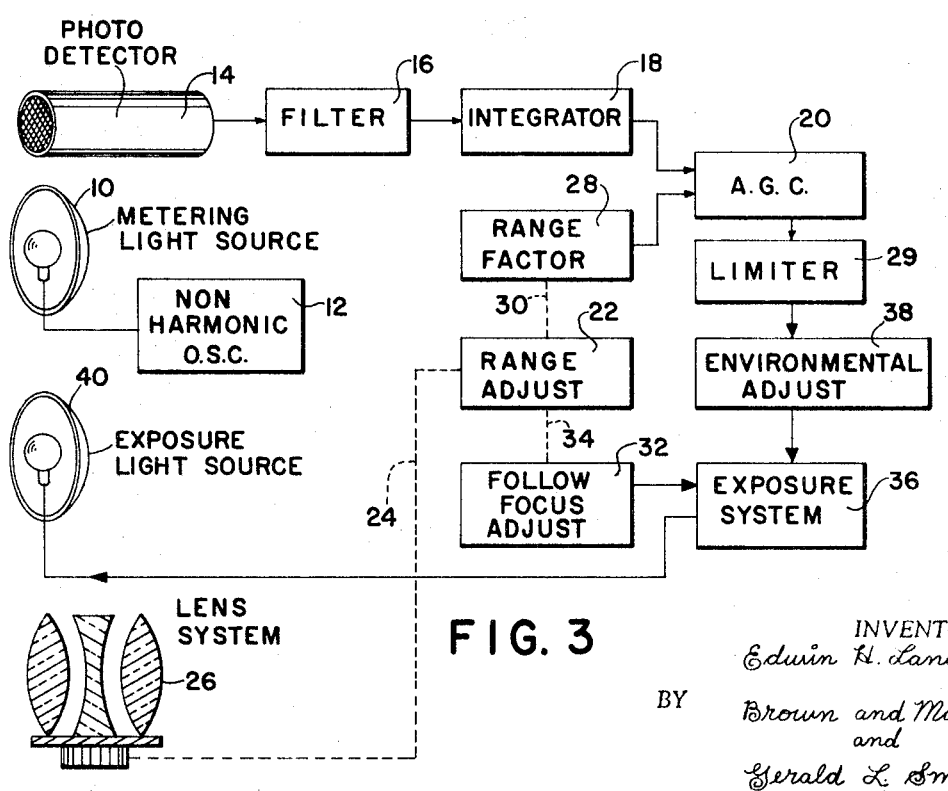
FIG. 3 is a schematic representation of an exposure control system according to the present invention.

Referring to FIG. 3, a more specific embodiment of the exposure control system is illustrated. In general, the embodiment performs the functions of: (a) measuring environmental reflectivity in isolation from artificial ambient light; (b) deriving a function of this reflectivity with respect to range to form a correction factor; (c) deriving an exposure valuation based on inverse square law technique; and (d) correcting the latter valuation by the amount of the correction factor.

The measurement of environmental reflectivity is carried out with the use of a metering light source such as flash light 10 which is positioned with the camera and aligned with its field of view. When energized, light source 10 provides a luminous output which is modulated by a conventional oscillating arrangement 12 at an excitation frequency which is non-harmonic with 60-cycle lighting or similar foreign illumination. The selectively modulated light output of metering source 10 is reflected from the subject of principal photographic interest and its surround and then detected by a photodetector 14. Photodetector 14, which may be one or a combination of conventional photocells, converts light energy from the illuminated scene into an electrical signal. This signal is introduced into and passes a filter 16 which rejects signals derived from ambient illumination. From filter 16, the signal now representing only reflections resulting from light source 10 illumination is directed into an integrator circuit 18. Circuit 18, which may be of the conventional R-C variety, serves to develop an output representing the integrated valuation of light reflecting from the environment of the subject being photographed. This output is then introduced into an automatic gain control (A.G.C.) circuit 20.

The structure of a conventional camera with which the instant system is incorporated usually will include a range adjustment mechanism for lens focusing. Such an adjustment is indicated schematically at 22. Ranging mechanism 22 may be linked as indicated at 24 with the focusing function of the camera lens system 26. For the present control system, mechanism 22 contributes its distance establishing function to both a range factor circuit 28 through linkage 30 and to a follow-focus adjustment function 32 from connection 34.

Follow-focus mechanism 32 functions to introduce into the camera exposure system 36 an exposure value adjustment or signal corresponding to an inverse square law evaluation such as that associated with curve I of FIG. 1. This adjustment may take a variety of forms depending upon the design of the exposure control system of the camera.

The range adjustment input to range factor circuitry 28 derives a proportioning factor signal for insertion into the automatic gain control circuit at 20. Simultaneously receiving the outputs of integrator 18 and range factor circuit 28, A.G.C. 20 forms an output representative of the correction factor of the control system. Accordingly, its output represents an integrated reflective light signal factored in relation to the camera-to-subject distance function block 20 is labeled as an Automatic Gain Control circuit inasmuch as such circuits generally may be described as operating to utilize a DC secondary signal to modify the amplitude of a given primary signal. In the present application, the integrated output or primary signal from integrator 18 is modified by a DC (secondary) signal representing the flash source-to-subject distance generated at block 28. The output of A.G.C. 20 then represents a correction factor as described earlier in connection with FIG. 2, i.e. environmental reflectivity as modified or refined by a factor representing range. Inasmuch as this output should be limited to form corrective adjustments having values confined between coaxial points upon curves I and II of FIG. 1, a limiter 29 is inserted into the output of A.G.C. 20. The output from limiter 29 is utilized to effect a second adjustment, to the exposure system 36 of the camera which is indicated functionally at 38. The form which the adjustment 38 takes as well as the sequence of its application may vary considerably inasmuch as it serves to alter the exposure value formed from follow-focus adjust 32. Electrically, the adjustment factor at 38 may take the form of a subtractive signal within an additive circuitry. Such a signal may be used, for example, to alter lens aperture, shutter speed or flash speed. Following the dual adjustment to camera exposure system 36, a photograph is taken using the conventional flash 40 as a light source. Those versed in the art will recognize that the power levels required to operate a sensing and evaluating circuitry as in the above outlined program will be very low. This desirably low level is realized as a result of the carefully tuned relationship extant between the nonharmonic excitation frequency of metering light source 10 and the detection circuit including photodetector 14 and filter 16.

The exposure control arrangement may enjoy further refinement by selectively adjusting the output intensity of its metering light source. For instance, this intensity may be lowered to the extent that it is invisible to human perception in a conventionally illuminated room or environment.

Figure 4:
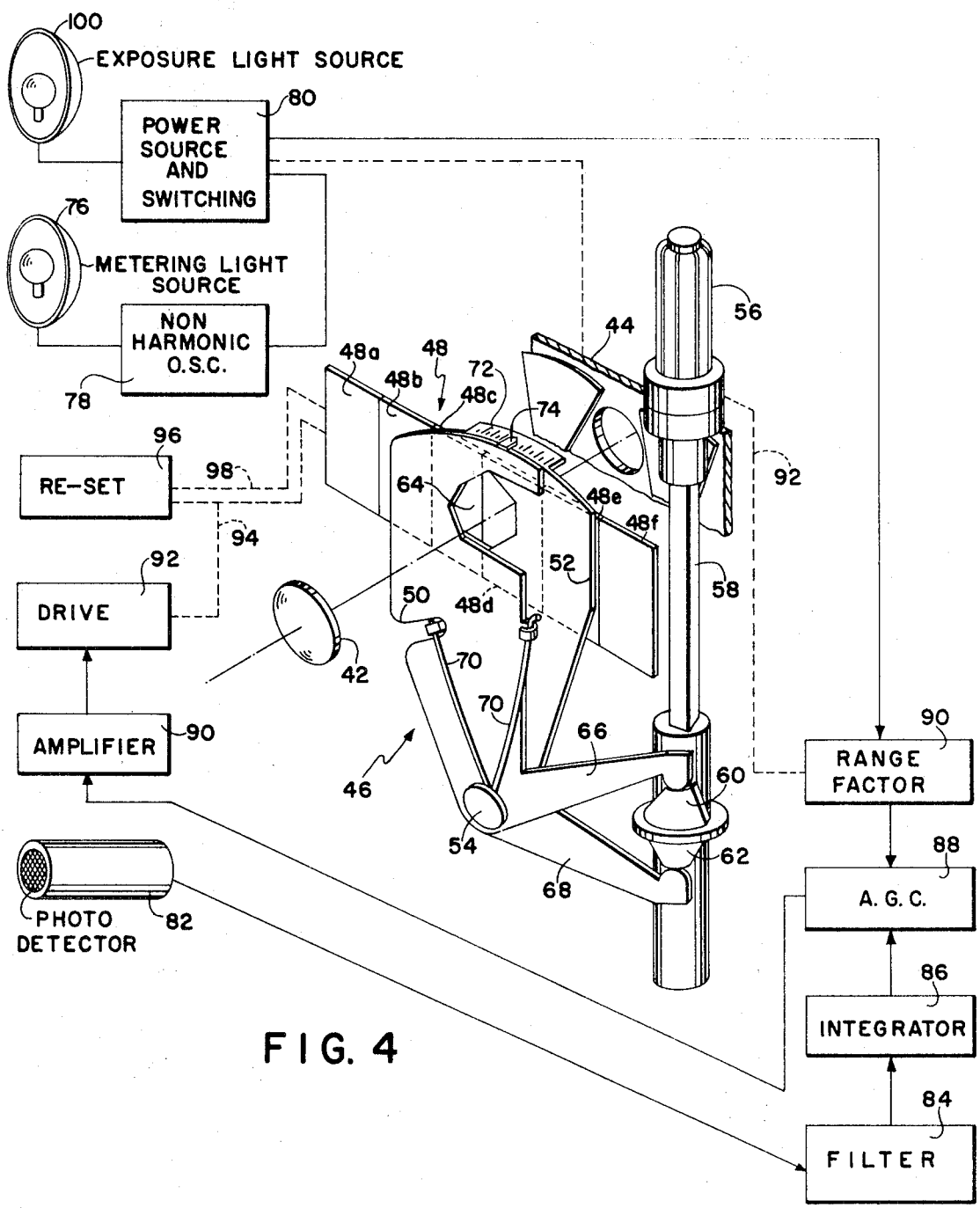
FIG. 4 is a partially schematic and pictorial representation of an embodiment of the exposure system of the invention.

Another embodiment for the control system of the invention is depicted in FIG. 4. In this embodiment, the inverse square law input to the exposure system is provided by an aperture adjustment and the correction for accommodating environmental reflectivity is provided through the use of an optical wedge of varying density.

The exposure function for a camera incorporating the present embodiment is shown schematically as including an objective lens 42 in axial alignment with a shutter arrangement 44. Disposed between lens 42 and shutter 44 is an aperture adjusting diaphragm assembly, shown generally at 46, and an optical wedge indicated generally at 48. Diaphragm 46 includes a pair of blades 50 and 52 pivotally mounted together at a bearing 54. The diaphragm blades are positionable at various relative angular orientations by manipulating a control knob 56. Control knob 56 is connected by a shaft 58 to a cam arrangement having complementary wedgelike surfaces 60 and 62, each inclined around its periphery. Blades 50 and 52 are symmetrically contoured at their respective upper portions to define an aperture 64 and are formed having cam follower extensions respectively at 66 and 68 which operatively engage cam surfaces 60 and 62. Cam followers 66 and 68 are urged into engagement with the cam surface by a wire spring 70 wrapped around bearing 54. Along the upward portion of blade 52, there is formed a flanged section 72 having range indicia marked thereon. This flange is arranged to cooperate with an index pointer 74 extending from the top of blade 50. The effective area of the aperture 64 may be increased or decreased by rotating control knob 56.

To insert an inverse square law exposure value setting into the exposure system, the area of aperture opening 64 is adjusted to a value in conformance with the camera-to-subject distance. This is accomplished by manipulating control knob 56 until index pointer 74 is aligned with the appropriate range marking at 72.

Similar to the earlier described embodiment, the reflectivity correction factor is derived from the environmental reflections of a metering flash 76 positioned with the camera and aligned with its field of view. The output of flash 76 is modulated by a conventional oscillating arrangement 78 at an excitation frequency which is not harmonically related to 60-cycle lighting or similar ambient illumination. Power and switching for the flash 76 is indicated generally at 80. The selectively modulated output of metering flash 76 is reflected from the photographic environment and detected at an appropriately aligned photodetector 82. The resultant output of photodetector 82 is introduced into a filter 84 sympathetic only to the frequency developed by metering flash 76. From filter 84, an output now representing reflections of metering flash 76 illumination is directed into a conventional integrator circuit 86. Integrator 86 collects the output from filter 84 to produce a signal representative of the overall reflectivity of the environment of the photographic scene. This signal is then presented to an automatic gain control (A.G.C.) circuit 88.

Returning to the range adjustment mechanism, as control knob 56 is manipulated, a range responsive factor is simultaneously provided at 90 through an interconnecting linkage 92. This range factor, which may be derived as the output of a variable resistor, is inserted, as before into the A.G.C. circuit 88. The magnitude of the output of A.G.C. 88 is representative of the environmental correction factor. In the present embodiment, this correction factor is inserted into the exposure system by imposing a select, optically dense portion of a calibrated optical wedge 48 over the aperture 64. Wedge 48 is formed having a series of progressively more dense segments identified at 48a through 48f. These segments encompass a light attentuating range amounting to about two F stops as suggested by the maximum spacing between curves I and II in FIG. 1. The mechanism of the correction system positions the wedge in a manner relating the optical density of the segment before the aperture 64 to the magnitude of the correction factor output of A.G.C. 88. This manipulation may be accomplished by amplifying the output of A.G.C. 88 at 90. The amplified output is then used to selectively energize or control a drive means 92 shown linked with wedge 48 at 94. Drive means 92 may assume a variety of forms such as a motor or an electrically latched or controlled spring driven mechanism. After each exposure, a reset mechanism 96 is actuated to return wedge 48 via linkage 98 to a position removed from aperture opening 64. Following the above described dual adjustment to the camera exposure system, a photograph is taken using the conventional flash unit 100.

A very simple but less accurate embodiment of the exposure control system of the invention may be realized by altering the reflectivity measurement technique of the system of FIG. 4. In the simplified adaptation, the wedge 48 or an equivalent aperture trim arrangement would be positioned by a dial and index mechanism. This dial would be adjusted to about four aperture opening trim settings approximating generalized correction factors. The camera operator would be required to form a generalized judgment of environmental reflectivity and adjust the trim setting accordingly. Exemplary indicia for the dial are such settings as: "light surroundings-near," "light surroundings-far," "dark surroundings" and "outside-night."

As is suggested from the foregoing, a wide variety of embodiments incorporating the unique exposure control system of the invention will occur to those skilled in the art. For instance, in carrying out the invention any one of several controllable exposure control parameters may be varied both as a function of camera-to-subject distance and as a function of the reflection characteristics of the environment. The embodiment shown in the illustrations controls the exposure aperture in accordance with both functions while the exposure interval and the energy of the artificial illumination are considered as constants. It is equally within the purview of these teachings to control the exposure either by varying the exposure interval, or by controlling the light output from the flash unit in accordance with both functions. Similarly any combination of these parameters may be controlled in accordance with both functions. For example, with a constant shutter speed the aperture may be varied strictly in accordance as a function of camera-to-subject distance and the light output from the flash unit modulated as a function of the environmental reflection characteristics.

Since alterations as suggested may be made in the system and apparatus without departing from the basis of the invention herein involved, it is intended that all matter contained in the above description or shown in the accompanying drawings shall be interpreted as illustrative and not in a limiting sense.

I claim:

1. A flash exposure control system for use with a photographic camera comprising:
   means for defining an exposure aperture having an effective area representing a first exposure parameter and for uncovering and covering said exposure aperture for an interval of time representing a second exposure parameter;
   artificial illuminating means for illuminating a photographic subject from a position adjacent said camera during the period when said aperture is uncovered with light of an intensity representing a third exposure parameter;
   means for determining camera-to-subject distance and deriving a first factor representative thereof;
   means for causing said photographic subject and its surrounding environment to be illuminated with a metering light of predetermined intensity;
   means responsive to the metering light reflected from said subject and said environment for deriving a second factor; and
   means responsive to both of said factors for varying at least one of said parameters.

2. The flash exposure control system of claim 1 wherein said illuminating means is operative to illuminate said environment with artificial metering light generated at a frequency nonharmonic with artificial ambient illumination; and
   wherein said second factor deriving means is operative to respond only to reflections at said nonharmonic frequency.

3. The flash exposure control system of claim 2 wherein said first factor deriving means is operative to derive said first factor in correspondence with the light energy available from said artificial illuminating means at said camera-to-subject distance.

4. The flash exposure control system of claim 3 wherein said metering light responsive means is operable to derive said second factor as a function of said camera-to-subject distance.

5. The flash exposure control system of claim 3 wherein said factor responsive means is operative to derive a controlling function representing said first factor adjusted by the magnitude of said second factor for varying at least one of said parameters.

6. The exposure control system of claim 5 in which said second factor deriving means includes:
   photodetection means for sensing said environmentally reflected metering light and deriving a signal representative thereof; and
   means responsive only to said photodetected signal representing the said environmentally reflected light for deriving an integrated value thereof.

7. In combination:
   A photographic camera having an exposure mechanism including exposure aperture means and shutter means at least one of which is controllable in accordance with an exposure value;
   an artificial lighting unit for illuminating a subject from a position adjacent the camera;
   means for energizing said unit during an exposure; and
   control means responsive both to a camera-to-subject distance and to the reflective characteristics of the environment surrounding said subject for deriving an exposure value and causing the regulation of said exposure mechanism in accordance therewith.

8. The combination set forth in claim 7 including means for artificially illuminating the environment surrounding said subject with metering light.

9. The combination of claim 8 wherein said control means includes:
   means responsive to the environmental reflection of said metering light for providing a first function representative thereof;
   means for deriving a second function corresponding to the light energy available from said lighting unit at said camera-to-subject distance; and
   regulating means responsive to said first and second functions for controlling said exposure mechanism.

10. The combination of claim 9 wherein said environmentally responsive means is operative to derive said first function in accordance with said camera-to-subject distance.

11. The combination of claim 10 wherein said environmentally responsive means is operative to derive said first function as an integrated value of said metered light diminished in correspondence with said camera-to-subject distance.

12. The combination of claim 11 wherein said regulating means is operative to derive a said exposure value representing said second function adjusted by the magnitude of said first function.

13. An environmentally compensated range-responsive exposure control system for use in photographing a subject located a predetermined distance from a camera comprising:
   an artificial lighting unit for illuminating the said subject from a position adjacent the camera;
   an exposure mechanism having at least one controllable exposure parameter; and
   control means responsive both to said camera-to-subject distance and to the reflective characteristics of the environment surrounding said subject for controlling said exposure mechanism to regulate an exposure.

14. The exposure control system of claim 13 including means for illuminating the environment toward which said camera is oriented with artificial metering light.

15. The exposure control system of claim 14 in which said control means includes:

means adjustable in accordance with said camera-to-subject distance for providing a first variable function;

means responsive to the environmental reflection characteristics from said metering artificial light for deriving a second variable function; and means responsive to said first and second functions for effecting a control of at least said one exposure parameter.

16. The control system of claim 15 wherein said reflection responsive means includes:

means for assessing the light value of said environmentally reflected metering light; and means for adjusting said assessed light value with respect to said camera-to-subject distance.

17. The control system of claim 16 in which said adjustable means is operable to derive said first variable function in correspondence with the light energy available from said lighting unit at said camera-to-subject distance.

18. The control system of claim 17 in which said metering light illuminating means is operable to generate artificial light at an excitation frequency nonharmonic with artificial ambient illumination; and wherein said assessing means is operative to respond only to environmental reflections at said nonharmonic frequency.

19. The control system of claim 18 in which said reflection responsive means includes:

photodetection means for sensing said environmentally reflected metering light and deriving a signal representative thereof; and means responsive only to said photodetected signal representing the said environmentally reflected metering light for deriving an integrated value thereof.

20. A camera for photographing a subject located a predetermined distance therefrom comprising:

an exposure mechanism including exposure aperture means and shutter means at least one of which is controllable in accordance with an exposure value;

means mounted with said camera for controlling the energization of a lighting unit;

means adjustable in accordance with said camera-to-subject distance for providing a first variable function;

means responsive to the reflection characteristics of the environment surrounding said subject for providing a second variable function; and means responsive to both of said functions for deriving said exposure value.

21. The camera of claim 20 wherein said reflection responsive means includes means for deriving an integrated light value for said environmental reflection characteristics.

22. The camera of claim 20 wherein said exposure value deriving means includes means for controlling said exposure mechanism in accordance with said derived exposure value.

23. The camera of claim 22 wherein said reflection responsive means includes:

means for deriving an integrated light value for said environmental reflection characteristics; and means for adjusting said integrated light value with respect to said camera-to-subject distance.

24. The camera of claim 23 wherein said adjustable means is operable to derive said first variable function in correspondence with the light energy available from said lighting unit at said camera-to-subject distance.

25. The camera of claim 24 in which said reflection responsive means includes:

means for illuminating said environment from a metering light source so as to cause environmental light reflection; and means for assessing the characteristic of said environmental light reflection and deriving a light value representative thereof.

26. The camera of claim 25 including means for adjusting said assessed light value in correspondence with said camera-to-subject distance.

27. The camera of claim 24 in which said reflection responsive means includes:

means for illuminating said environment with metering light generated at an excitation frequency nonharmonic with artificial ambient illumination; and means responsive only to the environmental reflection of said nonharmonically generated light for deriving a light value representative thereof.

28. The camera of claim 27 including means for adjusting said light value in correspondence with said camera-to-subject distance.

29. An environmentally compensated range responsive exposure control system for use in photographing a subject located a predetermined distance from a camera comprising:

an artificial lighting unit for illuminating said subject from a position adjacent the camera;

means for energizing said lighting unit during an exposure;

an exposure mechanism having at least one controllable exposure parameter;

means for illuminating the environment surrounding said subject with metering artificial light; and control means responsive to the environmental reflection of said metering light and to said predetermined distance for controlling said exposure parameter.

30. The exposure control system of claim 29 wherein said illuminating means is operative to illuminate said environment with artificial metering light generated at a frequency nonharmonic with artificial ambient illumination; and wherein said control means is operative to respond only to said environmental reflections at said nonharmonic frequency.

31. The exposure control system of claim 30 wherein said control means comprises:

means for assessing said environmentally reflected metered light and deriving a first value representative thereof;

means for deriving a second value corresponding to the light energy available from said lighting unit at said predetermined subject distance; and means responsive to both said first and second values for controlling at least said one exposure parameter.

32. The exposure control system of claim 31 wherein said assessing means is operable to derive said first value as a function of said predetermined subject distance.

33. The exposure control system of claim 32 wherein said means responsive to both said first and second values is operative to derive a controlling function representing said second value adjusted by the magnitude of said first value.

34. The exposure control system of claim 33 wherein said means responsive to both said first and second values is operative to derive an exposure parameter control function representing said second value diminished by the amount of said first value.

35. A method for controlling the exposure control mechanism of a photographic camera comprising the steps of:

determining the camera-to-subject distance and deriving a first factor representative thereof;

illuminating said subject and its surrounding environment from a position adjacent said camera with an artificial metering light source;

deriving a second factor representative of the environmental reflection of said metering light;

exposing a photosensitive material to light from said subject and its environment;

simultaneously illuminating said subject and its environment with artificial illumination generated from a position adjacent said camera; and controlling the said exposure of said photosensitive material in accordance with both of said factors.

36. The method of claim 35 wherein said subject and its environment are illuminated with light generated at an excitation frequency nonharmonic with artificial ambient illumination; and said second factor is derived in response only to said environmental reflections at said nonharmonic frequency.

37. The method of claim 36 wherein said first factor is derived in correspondence with the light energy available from the light source utilized for photographing said subject.

38. The method of claim 36 wherein said second factor is derived as in correspondence with said camera-to-subject distance.

39. The method of claim 38 wherein said camera exposure performance is controlled in accordance with a function representing said first factor adjusted by the magnitude of said second factor.

40. The method of claim 36 wherein said nonharmonic illumination is provided at an intensity selected in correspondence with the intensity of said ambient illumination so as to be substantially nonperceptive to human acuity.

41. The method of claim 36 wherein said second factor is derived by:
  photodetecting the reflection from said illuminated environment so as to derive a signal corresponding thereto;
  integrating the portion of said signal representing only reflection from said nonharmonically generated light; and
  adjusting said integrated signal in correspondence with said camera-to-subject distance.

42. The method of claim 41 wherein said camera exposure performance is controlled in accordance with a function representing said first factor adjusted by the magnitude of said second factor.